June 5, 1956

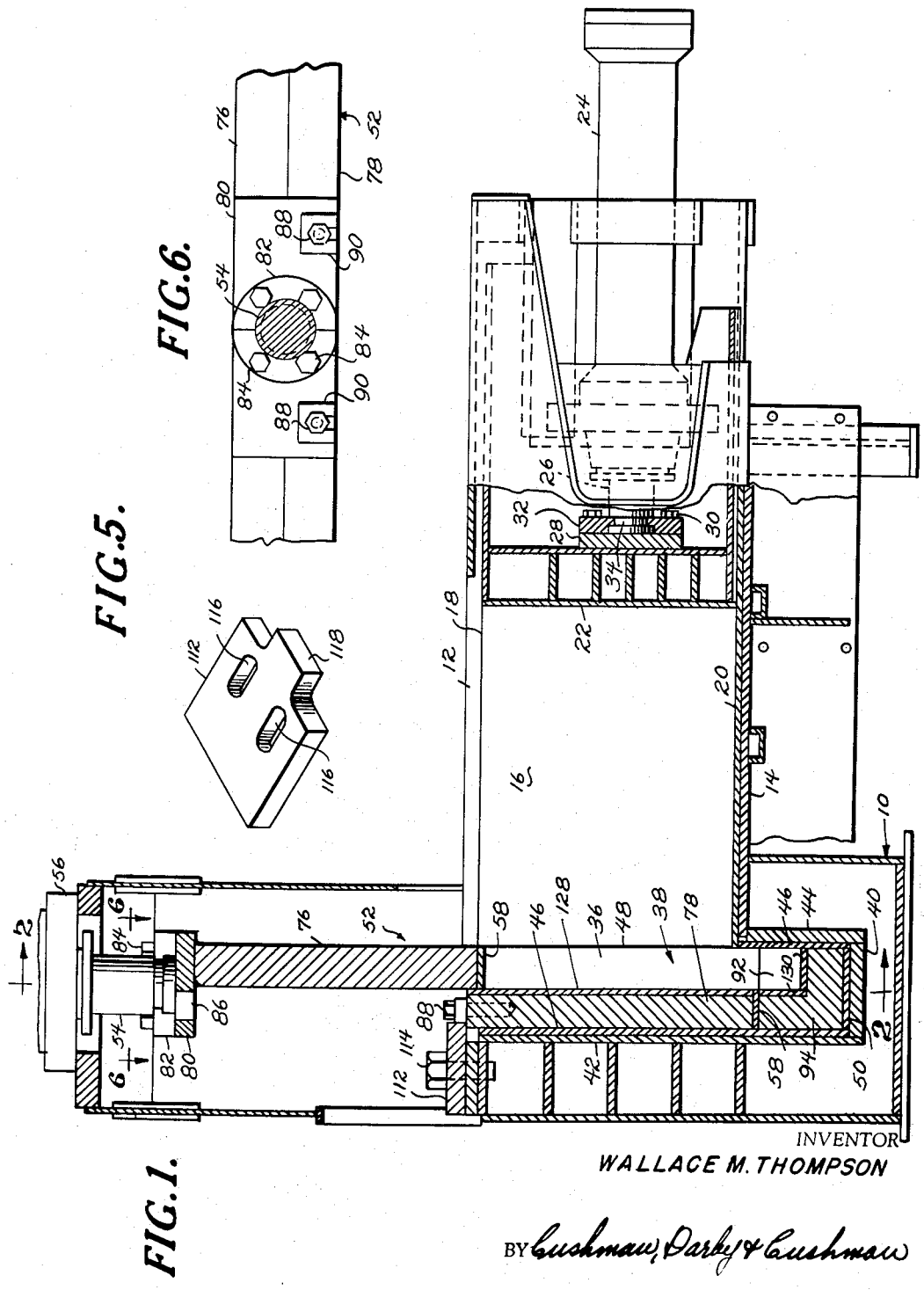

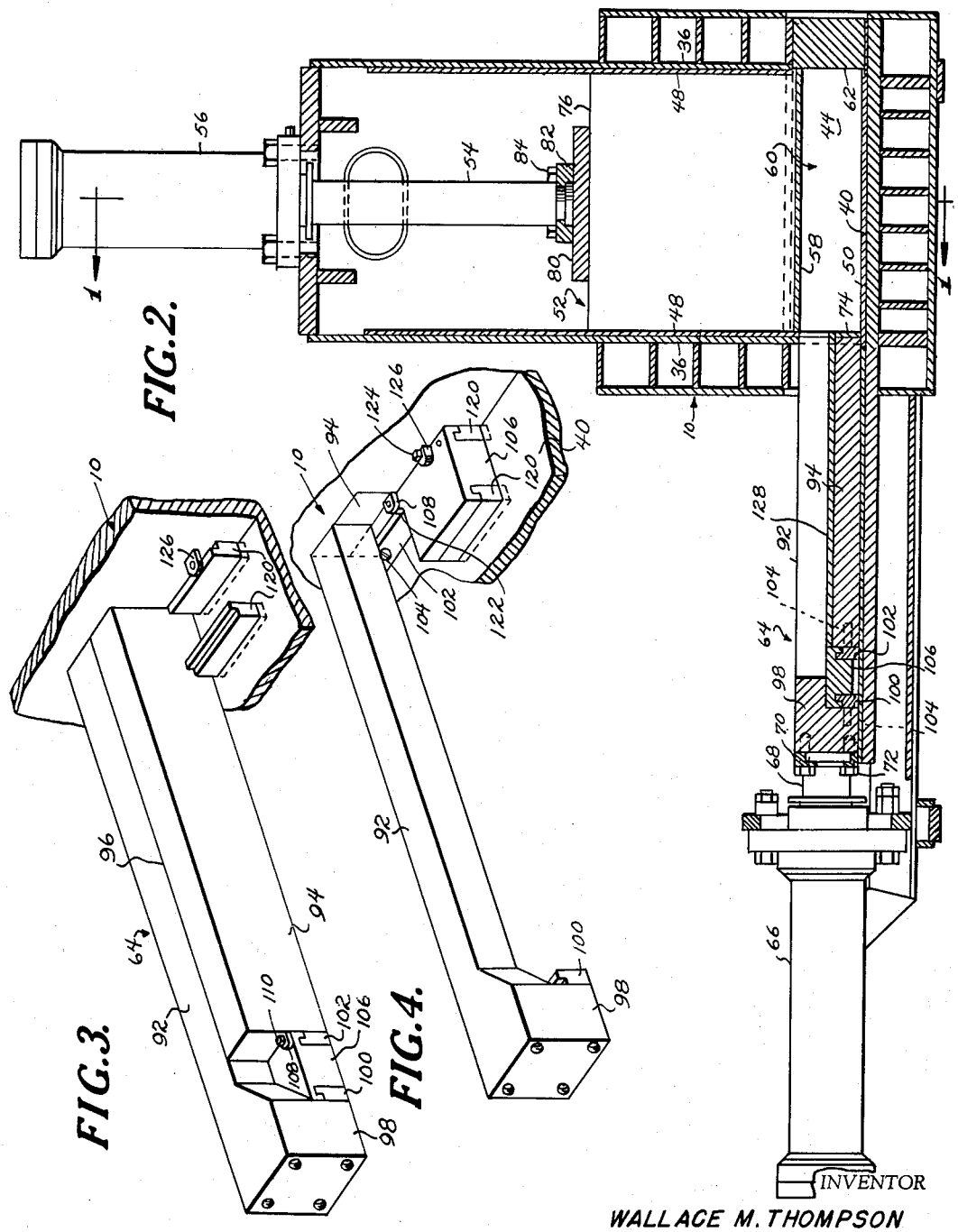

W. M. THOMPSON 2,748,694

BALING PRESS

Filed July 9, 1954

INVENTOR
WALLACE M. THOMPSON

BY Cushman, Darby & Cushman
ATTORNEYS

United States Patent Office 2,748,694
Patented June 5, 1956

2,748,694

BALING PRESS

Wallace M. Thompson, Cordele, Ga., assignor to Harris Foundry & Machine Company, Cordele, Ga., a corporation of Georgia Application July 9, 1954, Serial No. 442,234

8 Claims. (Cl. 100—232)

This invention relates to baling presses, and more particularly to a novel baling press for forming bales of different sizes.

Baling presses are becoming of increasing importance in the scrap metal industry, because the baling of metal scrap greatly facilitates its handling and transportation. Most baling presses are adapted to form a bale of generally parallelepiped shape having fixed transverse dimensions and an approximately constant length, the length usually being determined by the amount of metal in a given charge to the press. Scrap that is segregated by composition is more valuable than non-segregated scrap, but such segregation gives rise to variations in weight between bales of the same size but of different composition. Thus, for example, it readily will be seen that a bale of copper scrap will be heavier than a bale of iron scrap of the same size. Such weight variations are due not only to different densities of the metals, but also to the fact that some metals are compactible more easily than others. A heavy bale, however, creates a considerable handling problem.

The present solution to the heavy bale problem is to use two separate presses, one a small press for the heavier and/or more compactible metals, e. g., copper, and the other a larger press for the lighter and/or less compactible metals, e. g., iron. Thus, the bales from the two presses may be of about the same weight, although of different size. Furthermore, it is desirable in the scrap metal industry to bale non-ferrous metals in smaller sizes. It is evident that a baling press represents a capital investment and should be utilized to its full capacity to avoid monetary losses. Full utilization is not always possible, however, because of lack of the particular metal scrap for which the press is used, even though another type of metal scrap may be on hand. Hence, in some instances greater utilization could be made of a press if it were capable of making bales of different sizes.

Accordingly, it is an object of this invention to provide a baling press capable of forming bales of different transverse dimensions.

It is another object of this invention to provide a novel baling press capable of making bales of different sizes, and in which the adjustment of the press from one size bale to another involves only a simple mechanical adjustment without any structural changes in the press.

It is a further object of this invention to provide a baling press which meets the foregoing objects at a minimum of expense, and the principles of which can be applied to convert existing presses, at minimum expense, to form bales of different sizes.

Other objects and advantages of the invention will become evident from the following description and accompanying drawings, in which:

Figure 1 is a vertical sectional view through a three-compression baling press embodying this invention. The view is taken substantially on line 1—1 of Figure 2, but showing the press adjusted to make a small size bale.

Figure 2 is a vertical sectional view taken substantially on line 2—2 of Figure 1, but showing the press adjusted to make a large size bale and with the parts positioned for the start of the last compression operation.

Figure 3 is an enlarged fragmentary perspective view of a portion of the baling press shown in Figure 2.

Figure 4 is a view corresponding to Figure 3, but showing the press adjusted to make a bale of smaller size.

Figure 5 is an enlarged perspective view of a locking part of the press shown in Figure 1.

Figure 6 is a sectional view taken on line 6—6 of Figure 1.

Figure 7:
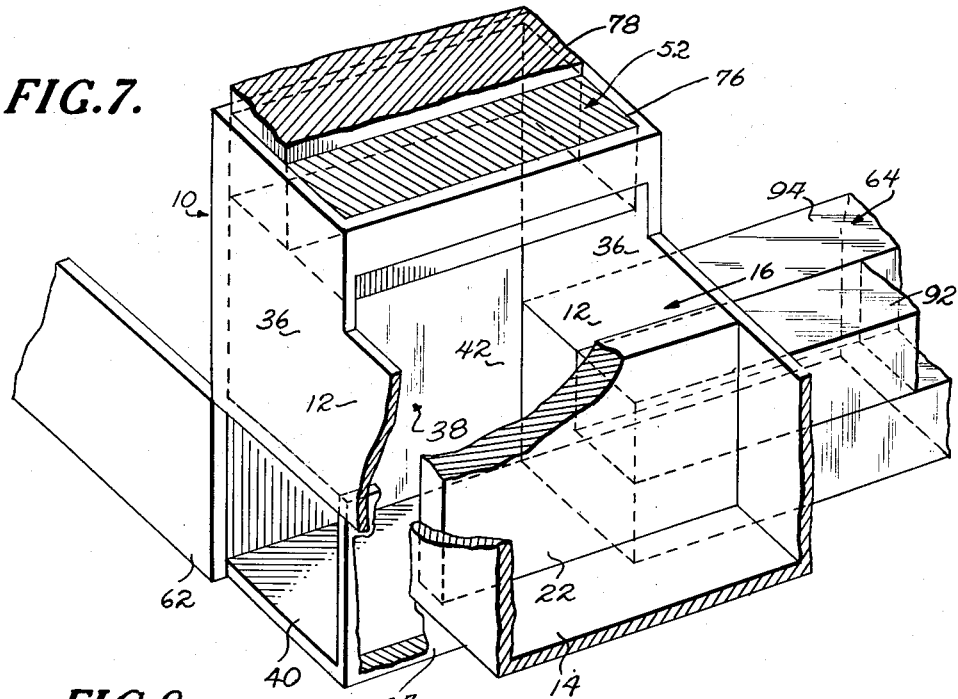
Figure 7 is a fragmentary perspective, partially diagrammetric, view of a baling press embodying this invention and illustrating the press adjusted to form a large bale.

Referring now to Figures 1 and 2 of the drawings, there is shown a baling press embodying this invention and having three compression stages. The press has a reinforced frame 10 forming the upstanding fixed sides 12 and fixed bottom 14 of an open-top charging chamber 16, illustrated diagrammatically in Figures 7 and 8. Preferably, the exposed interior surfaces of the sides 12 and bottom 14 are provided with replaceable wear or liner plates 18 and 20, respectively. One end of the charging chamber 16 is formed by a reinforced box-like gatherer platen 22 that is slidable and forcefully movable to the other and open end of the charging chamber 16 by a hydraulic power cylinder 24. The piston rod 26 of the cylinder is detachably connected to a backing plate 28, secured as by welding to the platen 22, by cap screws 30 extending through a split collar 32 having an inner circumferential flange engaging a circumferential groove 34 in the end of the rod 26.

At the open end of the charging chamber 16, the press frame 10 forms the fixed upstanding ends 36 of a compression chamber 38 (shown best in Figure 7) which has a bed plate 40 defining the bottom thereof that is disposed below the bottom 14 of the charging chamber. The fixed ends 36 of the compression chamber 38 extend only slightly below the bottom 14 of the charging chamber 16, for reasons later evident. The press frame 10 also forms a fixed upstanding compression chamber side 42 spaced from and opposed to the open end of the charging chamber 16, and a fixed side portion 44 extending between the bottom 14 of the charging chamber 16 and the bottom 40 of the compression chamber 38. The fixed ends 36, sides 42 and 44, and bottom 40 of the compression chamber are also desirably provided with replaceable wear plates 46, 48, and 50, respectively.

The top of the compression chamber 38 is formed by a two-part tramper ram 52 that is detachably connected, as later explained, to the end of a piston rod 54 of a hydraulic cylinder 56 mounted vertically on top of the press frame 10. The ram is forcefully movable by the cylinder 56 down into the compression chamber 38 to a level slightly below the bottom 14 of the charging chamber 16, and the lower end face of the ram 52 is also desirably provided with replaceable wear plates 58. When the tramper ram 52 is moved downward to substantially its full extent so that its lower end face is disposed slightly below the bottom 14 of the charging chamber, it defines, with the fixed bottom 40 and fixed sides 42 and 44 of the compression chamber 38, a press box 60 (Figure 2), which in the embodiment illustrated is square in transverse section. One end of the press box 60 is normally closed by a sliding discharge door 62, while the other end of the press box is formed by a two-part horizontal ram 64 that is slidably and forcefully movable into the press box by a hydraulic cylinder 66. The piston rod 68 of the cylinder 66 is detachably connected to the ram 64 by a split collar 70 and cap screws 72 similar to the aforedescribed collar 32 and screws 30. Desirably, the end face of the ram 64 is also provided with replaceable wear plates 74.

In operation of the aforedescribed baling press, to make a large-size bale having the same transverse dimensions as the press box, the gatherer platen 22 is completely retracted and a charge of scrap metal is loaded into the charging chamber 16. Thereupon, with the two rams 52 and 64 in their retracted positions, as shown in Figure 7, the cylinder 24 is operated to advance the gatherer platen 22 and move the charge beneath the tramper ram 52 into the compression chamber 38 and compress the charge therein. While the gatherer platen 22 is so advanced, the cylinder 56 is operated to move the tramper ram 52 downwardly and compress the charge into the press box 60, as shown in Fig. 2. At this time and while the tramper ram 52 is advanced, the gatherer platen 22 may be retracted so that another charge can be deposited in the charging chamber 16. While the tramper ram 52 is advanced, as described above, the horizontal ram 64 is moved into the press box 60 to further compress the charge therein between the end of the ram 64 and the discharge door 62. After the horizontal ram 64 has advanced to a point, substantially determined by the size of the original charge, to form a compact, dense bale having transverse dimensions the same as those of the press box 60 and a length more or less dependent upon the original size of the charge, the pressure in the cylinder 66 is relieved and the discharge door 62 is opened; whereupon, the ram 64 can be advanced still farther to push the aforedescribed bale out of the then-open end of the press box 60. Thereupon, the ram 64 and the tramper ram 52 are retracted in readiness for another baling cycle.

As previously described, it is frequently desirable to be able to form bales of different sizes in the same press. In the press illustrated in Figures 1 and 2, a bale can be formed having a size smaller than the transverse dimensions of the press box 60. This is accomplished by providing a split tramper ram 52 and a split longitudinal ram 64. In the embodiment shown, the tramper ram 52 is formed in two parts 76 and 78 of identical transverse dimensions that are separable along a vertical plane extending parallel to the directions of movement of both the horizontal ram 64 and the tramper ram 52. The part 76 is secured, as by welding, to a backing plate 80 that is detachably secured to the end of the piston rod 54 by a split collar 82 and cap screws 84 similar to the collar 32 and screws 30. The top of the other ram part 78 has a pair of laterally-spaced tapped recesses therein registering with oversized openings 86 in the plate 80. As shown best in Figure 6, in order to secure the ram parts 76 and 78 together for simultaneous operation to make large-size bales, cap screws 88 threaded into the recesses in the part 78 extend freely through the oversized openings 86 and have U-shaped lugs 90 (Figure 6) interposed between the heads of the screws 88 and the top of the plate.

The horizontal ram 64 is likewise divided longitudinally into two parts 92 and 94, which have a line of separation 96 (Figure 3) on top of the ram 64 that extends in the plane of separation of the tramper ram parts 76 and 78. As shown best in Figures 1, 7, and 8 of the drawings, the part 94 of the horizontal ram 64 is substantially L-shaped in transverse section, while the other part 92 of the horizontal ram is square in transverse section and complementary to the L-shaped part, so that when assembled the two parts 92 and 94 form a square in transverse section. Thus, the part 92 of the horizontal ram may be termed "the quarter part" and the other part 94 may be termed "the three-quarter part."

As best shown in Figures 2, 3, and 4, the rear end of the quarter part 92 of the ram 64 is enlarged laterally and downwardly to a full size square section 98 to which the piston rod 68 is detachably secured by the cap screws 72. The three-quarter ram part 94 is shorter in length than the quarter part 96 and terminates at its rearward end in a transversely-flat surface. A flat surface opposed to the rearward end of the part 94 is also formed on the enlarged rear end section 98 of the quarter part 92, and a pair of opposed keyways 100 and 102 are detachably secured, as by cap screws 104, to the aforementioned opposed surfaces on the quarter part 92 and the three-quarter part 94, respectively. A key 106 is slidably and interfittingly engageable with the keyways 100 and 102 to firmly secure the two parts 92 and 94 together for movement as a unit. A lug 108 on the three-quarter part 94 has a tapped aperture therein for the reception of a cap screw 110 which depends into an aperture in the key 106 to prevent displacement thereof.

In order to adjust the press to form a smaller size bale, the horizontal ram 64 is advanced into engagement with the discharge door 62 and the tramper 52 is advanced to its lowermost position in engagement with the upper side of the horizontal ram 64. At this time, the cap screws 88 are loosened and the U-shaped members 90 removed therefrom, so that on retraction of the piston rod 54 only the ram part 76 will rise therewith while the ram part 78 will remain in the position shown in Figures 1 and 8. Retention of the ram part 78 in this position preferably is assured by a retaining member 112 (Figures 1 and 5) adjustably mounted on the frame 10 by a pair of cap screws 114 passing through elongated openings 116 in the member 112. The member has a tongue 118 engageable over the upper end of the tramper ram part 78, in an adjusted position of the member 112, to retain the part 78 in the position shown in Figure 1. Thereafter, the cap screw 110 is loosened or removed and the key 106 is slid from between the quarter ram part 92 and the three-quarter ram part 94 onto a pair of parallel guideways 120 set into or otherwise secured to the bed plate 40 just outside of the press box 60, as shown in Figure 4. It will be noted that the key 106 has a projection 122 thereon which overlaps the rearward end of the three-quarter part 94 when the key is on the guideways 120 to retain the ram part 94 in the press box 60. A cap screw 124 extending through a lug 126, welded or otherwise suitably secured to the exterior of the press frame 10, depends into another aperture in the key 106 to lock the same in the position shown in Figures 1 and 4.

Figure 8:
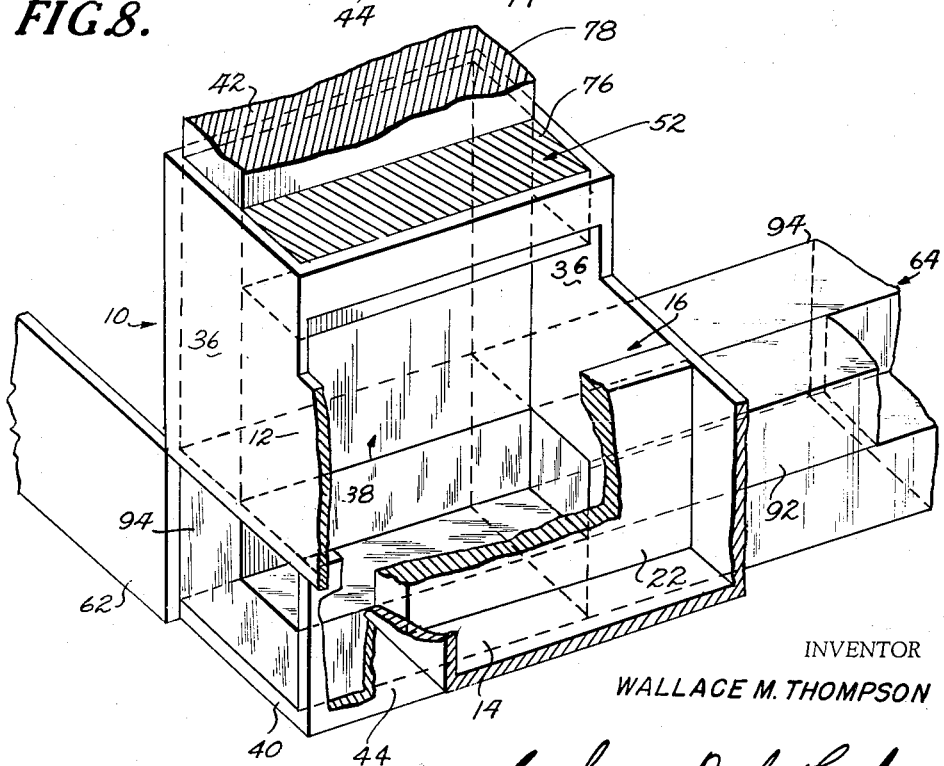
Figure 8 is a view corresponding to Figure 7, but illustrating the adjustment of the press to form a smaller size bale.

It thus will be seen that operation of the press with the ram parts 78 and 94 fixedly secured in the aforedescribed manner and with only the ram parts 76 and 92 movable by the cylinders 56 and 66, as shown in Figures 1 and 8, will serve to form a bale having transverse dimensions equal to exactly half those of the bale formed in normal operation of the press. Desirably, the surfaces of the parts 78 and 94 exposed to wear are provided with replaceable wear plates 128 and 130.

It thus will be seen that the objects of the invention have been fully and effectively accomplished. It will be realized, however, that the specific embodiment shown and described for the purpose of illustrating the principles of this invention is susceptible to change without departure from such principles. For example, the rams 52 and 64 could be split longitudinally at different locations from those illustrated and described to form a small bale of a different transverse size and/or configuration from the one formed by the press illustrated. Further, the longitudinal ram 64 could be vertically divided, instead of being longitudinally split into the quarter and three-quarter parts as shown, to form a small bale having a vertical transverse dimension equal to the height of the press box 60. Hence, this invention includes all modifications and embodiments encompassed within the spirit and scope of the following claims.

I claim:

1. In a baling press the combination comprising: means defining a press box having opposed walls; and a ram forming one of said walls and movable inwardly of said box, said ram being split in the direction of its movement into at least two detachably-connected parts, whereby when said parts are connected a bale can be made having the same transverse dimensions as those of said box, and when said parts are disconnected and one part is disposed in said box in engagement with the other of said walls, a bale can be made having the same transverse dimensions as the other part.

2. The structure defined in claim 1 including means for retaining the one ram part in the box.

3. The structure defined in claim 1 including a movable discharge door forming the said other wall of the box.

4. The structure defined in claim 1 including a pair of transverse keyways, one on each ram part, and a key interfitting said keyways for detachably connecting the parts together.

5. The structure defined in claim 4 including a pair of transverse guideways mounted outside the press box adjacent the ram for slidably receiving the key with a portion of the latter overlapping the end of said one ram part when the latter is disposed in said box for retaining said one part therein.

6. In a baling press having at least two compression stages the combination comprising: means defining a compression chamber; a first ram forming a wall of said chamber and movable inwardly thereof to a limited extent to define therewith a press box at the full extent of said limited inward movement; a second ram forming a wall of said press box disposed at right angles to said chamber wall and movable inwardly of said box, each of said rams being split in the direction of its movement into at least two detachably connected parts, said first ram parts having a plane of separation extending parallel to the direction of movement of said second ram and said second ram parts having a line of separation, at the side surfaces thereof which confront said first ram, that lies in said plane.

7. The structure defined in claim 6 including means for retaining one of the first ram parts at the said full extent of limited inward movement of the first ram and means for retaining one of the second ram parts in engagement with the wall of the press box opposed to the second ram.

8. The structure defined in claim 6 including a movable discharge door forming the wall of the press box opposed to the second ram.

References Cited in the file of this patent

UNITED STATES PATENTS

| | | |
|---|---|---|
| Re. 7,438 | Van Emon | Dec. 19, 1876 |
| 2,244,078 | Perberg | June 3, 1941 |

FOREIGN PATENTS

| | | |
|---|---|---|
| 26,428 | Norway | Nov. 8, 1915 |